United States Patent
Yamaoka et al.

(10) Patent No.: US 8,726,196 B2
(45) Date of Patent: May 13, 2014

(54) GESTURE INPUT DEVICE, GESTURE INPUT METHOD, AND PROGRAM

(75) Inventors: Keisuke Yamaoka, Tokyo (JP); Jun Yokono, Tokyo (JP); Yuichi Hasegawa, Tokyo (JP); Ning Zhou, Tokyo (JP); Hirotaka Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 13/045,777

(22) Filed: Mar. 11, 2011

(65) Prior Publication Data
US 2011/0239118 A1 Sep. 29, 2011

(30) Foreign Application Priority Data
Mar. 25, 2010 (JP) ................................ 2010-070757

(51) Int. Cl.
  *G06F 3/033* (2013.01)
  *G06K 9/00* (2006.01)
  *G06K 3/00* (2006.01)
  *G06F 3/01* (2006.01)

(52) U.S. Cl.
  CPC .................................... *G06F 3/017* (2013.01)
  USPC ............................ 715/863; 715/709; 382/103

(58) Field of Classification Search
  CPC ...................................................... G06F 3/017
  USPC ......... 715/708, 709, 848, 849, 850, 851, 863; 382/103
  See application file for complete search history.

(56) References Cited

U.S. PATENT DOCUMENTS

| 7,274,800 | B2* | 9/2007 | Nefian et al. | 382/103 |
| 7,770,136 | B2* | 8/2010 | Beeck et al. | 715/863 |
| 2006/0187196 | A1 | 8/2006 | Underkoffler et al. | |
| 2010/0281432 | A1* | 11/2010 | Geisner et al. | 715/849 |
| 2011/0199292 | A1* | 8/2011 | Kilbride | 345/156 |

FOREIGN PATENT DOCUMENTS

| JP | 2006-99749 | 4/2006 |
| JP | 2006-163747 | 6/2006 |
| JP | 2008-530661 | 8/2008 |

OTHER PUBLICATIONS

U.S. Appl. No. 13/276,400, filed Oct. 19, 2011, Zhou, et al.

* cited by examiner

*Primary Examiner* — Haoshian Shih
(74) *Attorney, Agent, or Firm* — Oblon, Spivak, McClelland, Maier & Neustadt, L.L.P.

(57) ABSTRACT

A gesture input device includes an input unit to which image information representing an action is input. The gesture input device also includes a detection unit that detects the action based on a shape of the input image information. The gesture input device further includes a prediction unit that predicts one or more gestures based on a detection result of the action. In addition, the gesture input device includes a notification unit that notifies an action to be performed next to input the predicted one or more gestures.

8 Claims, 10 Drawing Sheets

FIG.3A
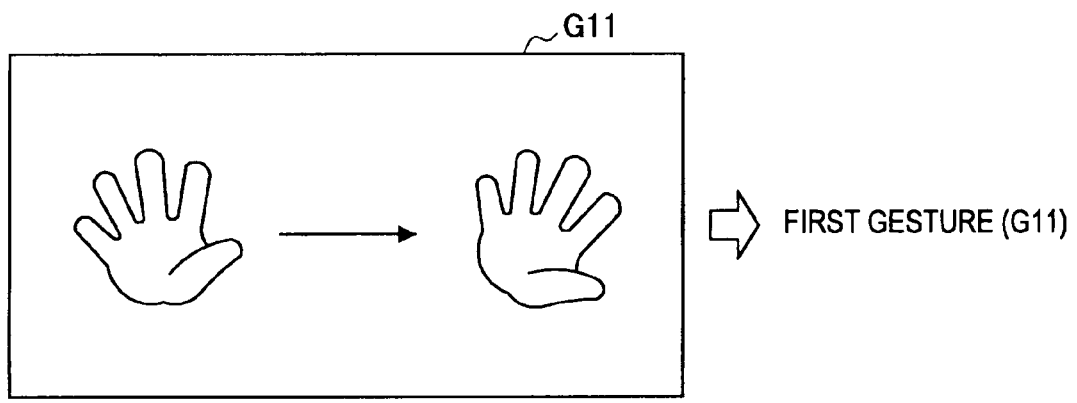
⇨ FIRST GESTURE (G11)
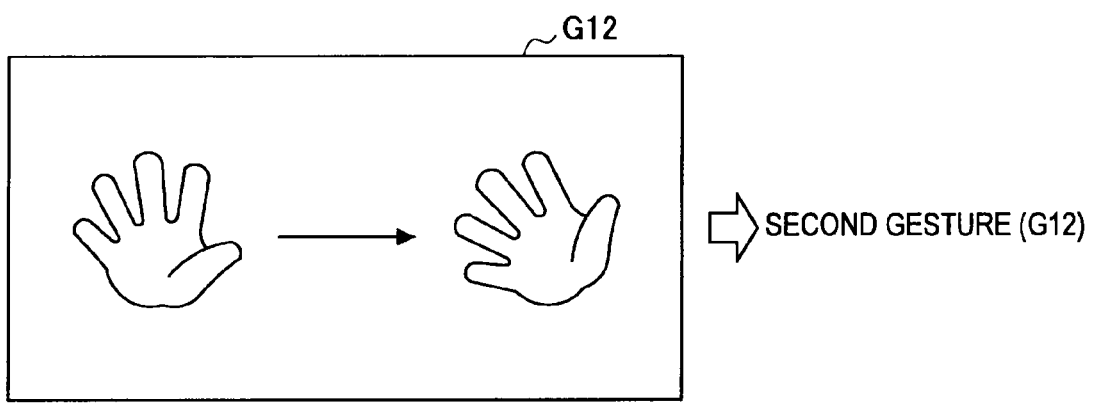
⇨ SECOND GESTURE (G12)

FIG.4A
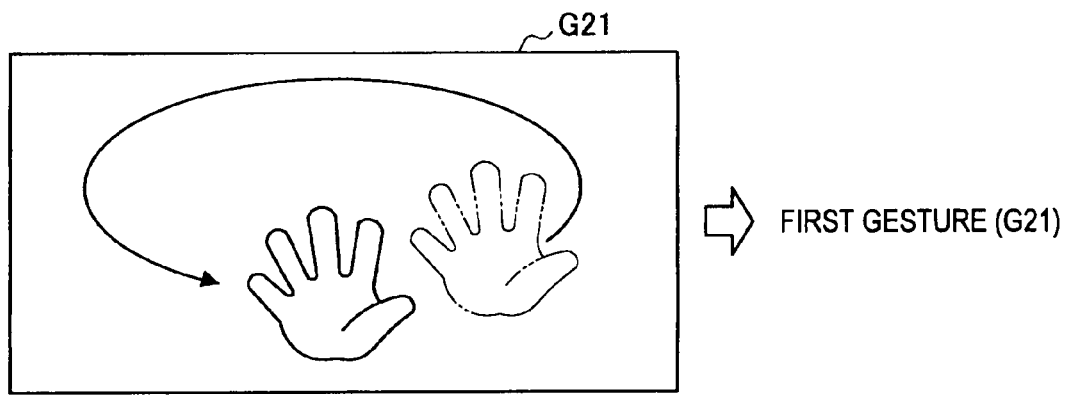
⇨ FIRST GESTURE (G21)
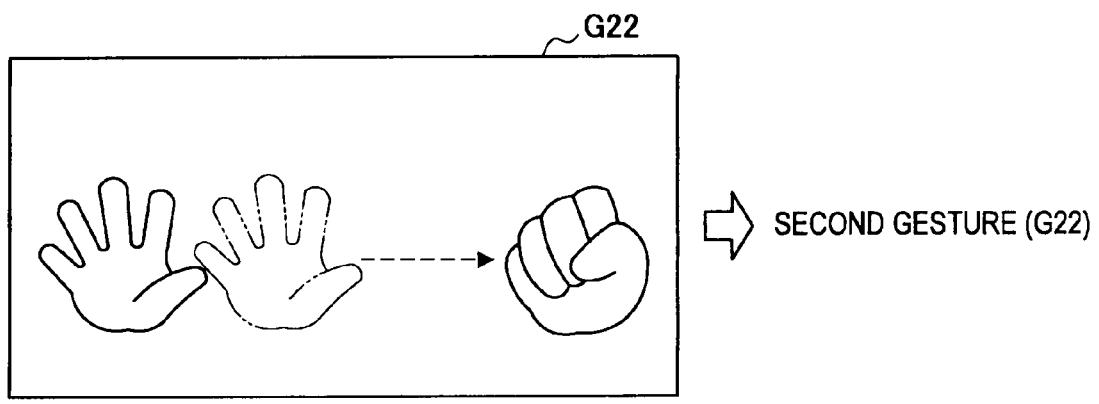
⇨ SECOND GESTURE (G22)

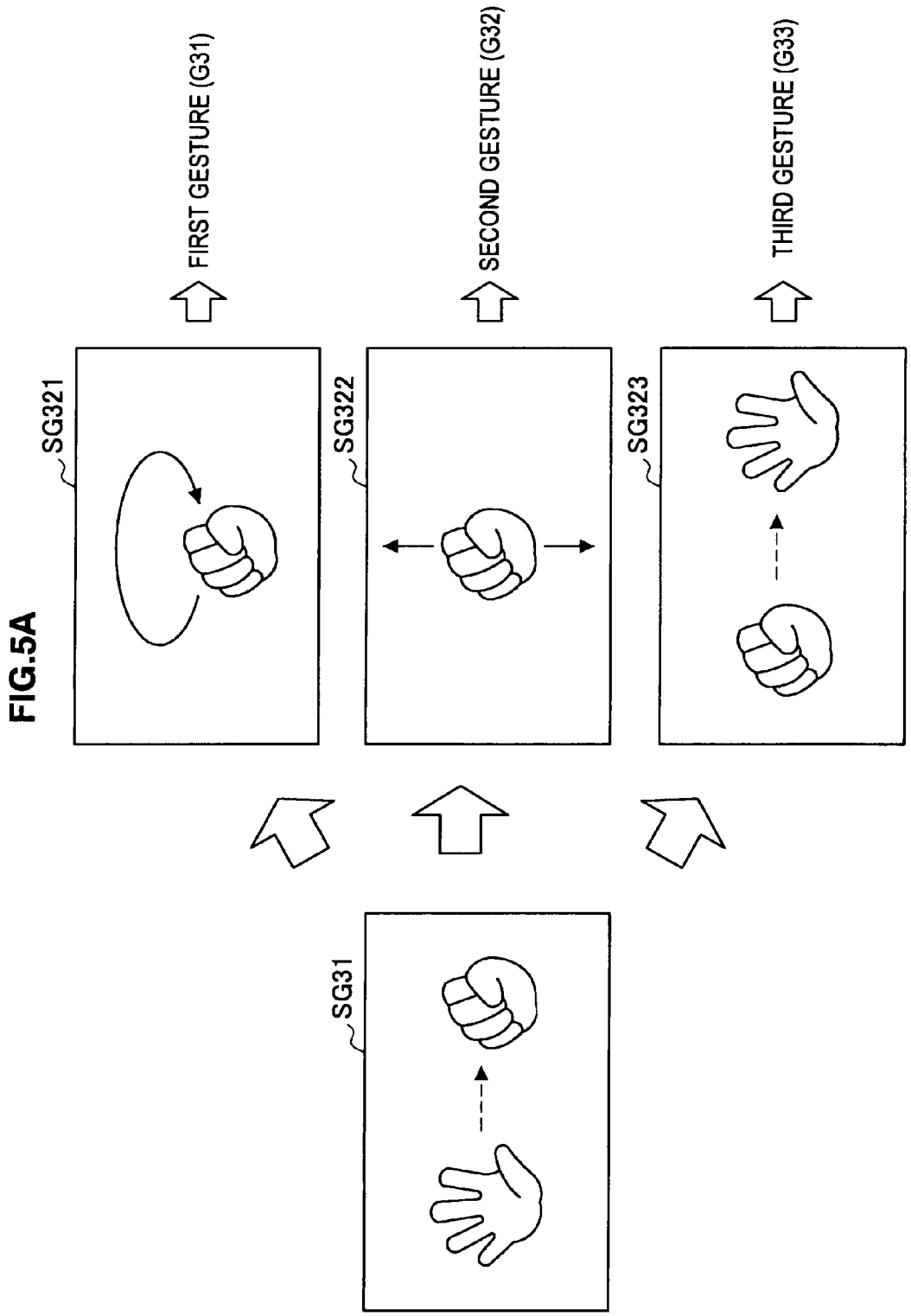

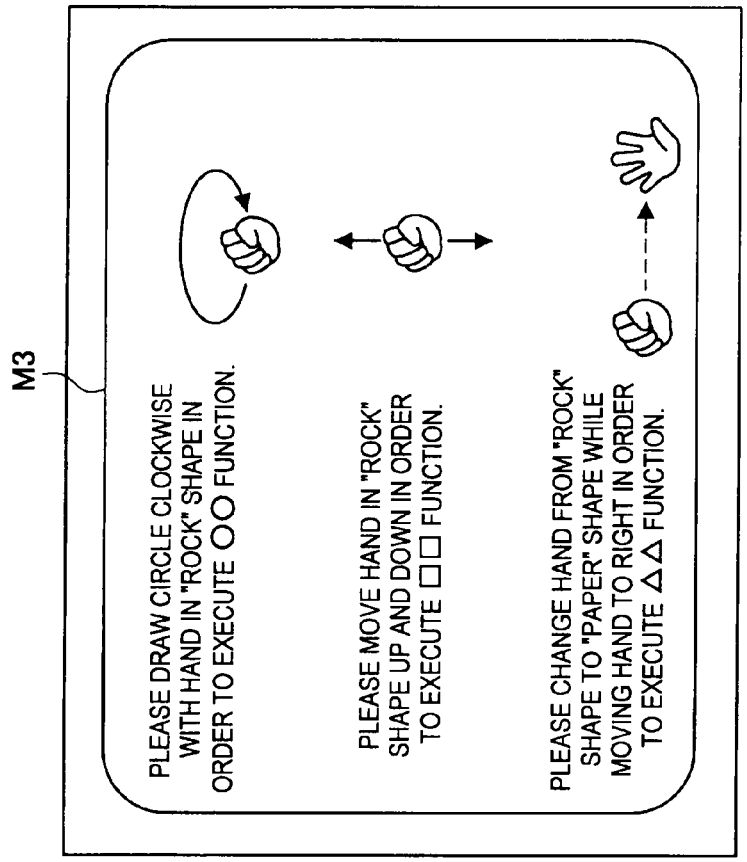
FIG.5B
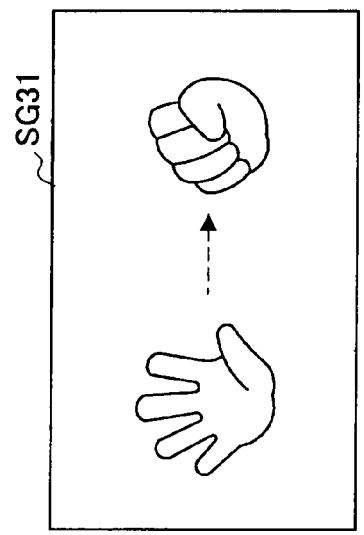

GESTURE INPUT DEVICE, GESTURE INPUT METHOD, AND PROGRAM

BACKGROUND OF THE INVENTION

1. Field of the Invention

The present invention relates to a gesture input device, a gesture input method, and a program.

2. Description of the Related Art

In recent years, a variety of user interfaces using gestures have been proposed (for example, Japanese Patent Application Laid-Open (JP-A) Nos. 2006-163747 and 2006-99749, and Japanese Patent Application National Publication (Laid-Open) No. 2008-530661). In these kinds of interfaces, if a user inputs a gesture, the gesture is recognized based on a detection result of image information and/or voice information representing the user's action. A recognition result is used for a variety of process control.

SUMMARY OF THE INVENTION

As techniques of these kinds of interfaces develop, convenience is improved, but it is expected that a kind and/or complexity of gestures to be input by the user will increase. As a result, the user is required to remember a variety of gestures, which decreases the convenience. Further, the user may remember irritability without the gesture being not correctly recognized or may feel anxious about whether the gesture is correctly recognized. This tendency becomes more remarkable as a kind and/or complexity of a gesture increases.

The present invention is directed to provide a gesture input device, a gesture input method, and a program in which a gesture can be correctly input even if a kind and/or complexity of the gesture increases.

According to an embodiment of the present invention, there is provided a gesture input device, including an input unit to which at least one of image information and voice information representing a user's action is input, a detection unit that detects the user's action based on the input at least one of the image information and the voice information, a prediction unit that predicts one or more gestures that the user desires to input based on a detection result of the action, and a notification unit that notifies the user of an action to be performed next by the user in order to input the predicted one or more gestures.

According to the above configuration, one or more gestures that the user desires to make are predicted based on a detection result of the user's action, and in order to input the predicted one or more gestures, the user is notified of an action to be performed next by the user. Therefore, even if a kind and/or complexity of the gesture increases, the gesture can be correctly input according to notification of an action to be performed next.

The gesture may include two or more sub gestures, the gesture input device may further include a recognition unit that recognizes a sub gesture input by the user based on the detection result of the action, the prediction unit may predict one or more sub gestures that the user desires to input next based on a recognition result of an immediately previously input sub gesture, and the notification unit may notify the user of an action to be performed next by the user in order to input the predicted one or more sub gestures.

A transition probability between the sub gestures may be calculated, and the notification unit may notify the user of an action to be performed next by the user so that each sub gesture can be discriminated according to a transition probability between an immediately previously input sub gesture and one or more sub gestures that the user desires to input next.

An input frequency of each gesture may be recorded, and the notification unit may notify the user of an action to be performed next by the user so that each gesture can be discriminated according to an input frequency of each gesture included in the predicted one or more gestures.

According to another embodiment of the present invention, there is provided a gesture input method, including the steps of detecting a user's action based on at least one of image information and voice information representing the user's action, predicting one or more gestures that the user desires to input based on a detection result of the action, and notifying the user of an action to be performed next by the user in order to input the predicted one or more gestures.

According to another embodiment of the present invention, there is provided a program for causing a computer to perform the gesture input method. Here the program may be provided using a computer readable recording medium, or may be provided via a communication method.

As described above, according to the present invention, a gesture input device, a gesture input method, and a program in which the gesture can be correctly input even if a kind and/or complexity of the gesture increases are provided.

BRIEF DESCRIPTION OF THE DRAWINGS

FIG. 3A is a diagram (1/2) illustrating a first operation example of a gesture input device.

FIG. 4A is a diagram (1/2) illustrating a second operation example of a gesture input device.

FIG. 5A is a diagram (1/2) illustrating a third operation example of a gesture input device.

FIG. 5B is a diagram (2/2) illustrating the third operation example of the gesture input device.

DETAILED DESCRIPTION OF THE EMBODIMENT(S)

Figure 1:
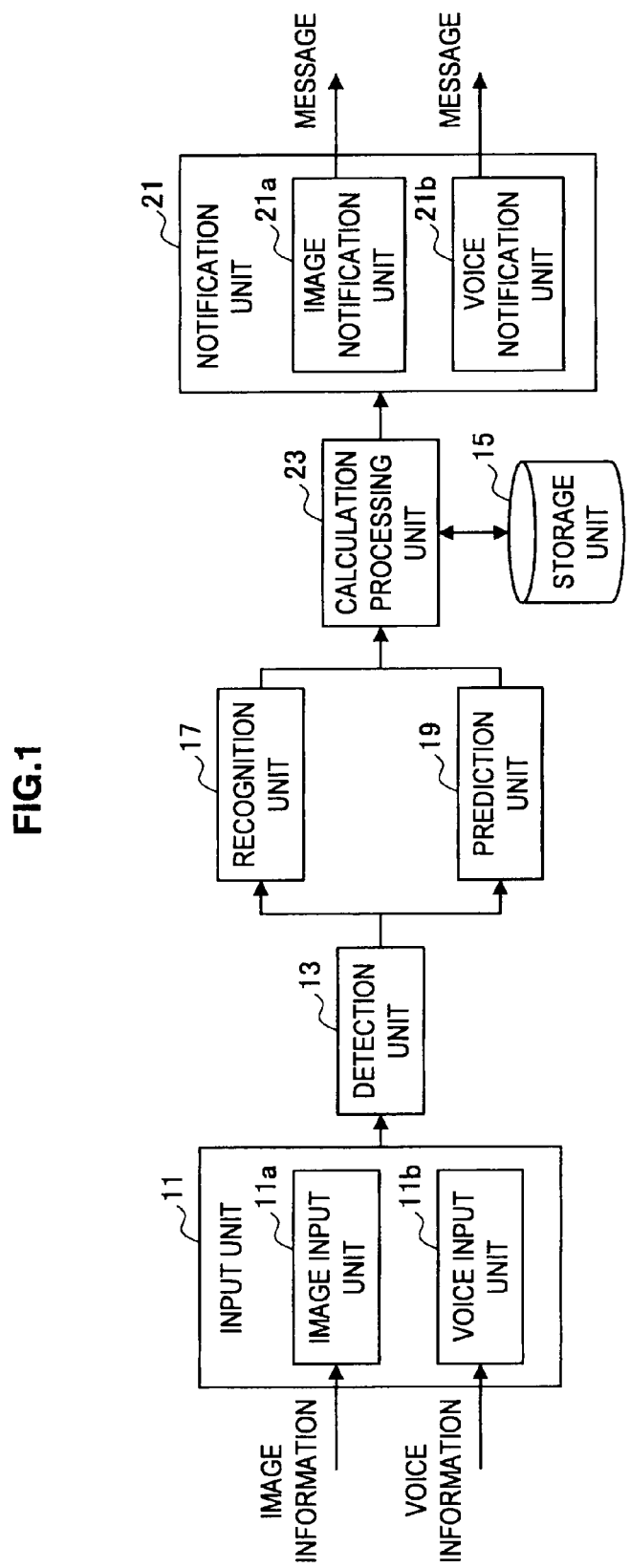
FIG. 1 is a block diagram illustrating a major functional configuration of a gesture input device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1. A Configuration of a Gesture Input Device]

First, a configuration of a gesture input device according to an embodiment of the present invention will be described. FIG. 1 illustrates a major functional configuration of a gesture input device.

As illustrated in FIG. 1, a gesture input device includes an input unit 11, a detection unit 13, a storage unit 15, a recognition unit 17, a prediction unit 19, a notification unit 21, and a calculation processing unit 23.

The input unit 11 includes an image input unit 11a such as a video camera and a voice input unit 11b such as a microphone. Image information representing a user's action A (including a user's action and an action of another object accompanied with the user's action) is input to the image input unit 11a. Voice information representing the user's action A (including a voice uttered by the user and a voice emanating from another object accompanied with the user's action) is input to the voice input unit 11b. The input unit 11 may include only any one of the image input unit 11a and the voice input unit 11b.

The detection unit 13 extracts an image feature from the image information input to the image input unit 11a and detects the user's action A. Further, the detection unit 13 extracts a voice feature from the input voice information and detects the user's action A. The detection unit 13 may detect the user's action A based on the image feature or the voice feature or may detect the user's action A based on a combination of the image feature and the voice feature. The detection unit 13 supplies the detection result of the action A to the recognition unit 17 and the prediction unit 19.

The storage unit 15 stores specifying information for specifying various kinds of gestures G (and sub gestures SG that constitute the gesture G) based on the detection result of the action A. The specifying information is based on a time-series variation of a feature quantity of the image information and/or the voice information representing the user's action A. The storage unit 15 stores a message M representing the action A to be performed next by the user in order to input one or more gestures G. Further, the storage unit 15 may store an input frequency of each gesture G and may store a transition probability P between the sub gestures SG that constitute the gesture G, which will be described in detail later.

The recognition unit 17 recognizes the gesture G (or the sub gesture SG) input by the user based on the detection result of the action A, and supplies the recognition result to the calculation processing unit 23. The recognition unit 17 recognizes the gesture G (or the sub gesture SG) based on the time-series variation of the feature quantity representing the user's action A. For example, in the case in which the gesture G is input by movement of a hand, the center position of the hand, the center position of each finger, the slope of each finger, the number of fingers, and the like are used as the feature quantity. Further, in the case in which the gesture G is input by the user's utterances, a frequency characteristic of the user's uttered voice is used as the feature quantity.

The prediction unit 19 predicts one or more gestures G (or sub gestures SG) that the user desires to input based on the detection result of the action A (or the recognition result of the sub gesture SG) and supplies the prediction result to the calculation processing unit 23. The prediction unit 19 predicts one or more gestures G that the user desires to input by comparing the detection result of the action A (or the recognition result of the sub gesture SG) with the specifying information. For example, in the case in which the gesture G is input by movement of the user's hand, one or more gestures G for which the feature quantity representing the detected movement of the hand is included in the specifying information are predicted. Further, in the case in which the gesture G is input by the user's utterance, one or more gestures G for which the feature quantity representing the detected uttered voice is included in the specifying information are predicted.

The notification unit 21 includes an image notification unit 21a such as a display and a voice notification unit 21b such as a speaker. In order to input the predicted one or more gestures G, a message M representing the action A to be performed next by the user is input from the calculation processing unit 23 to the notification unit 21. The notification unit 21 outputs an image message and/or a voice message as the message M.

The calculation processing unit 23 includes a central processing unit (CPU), a read only memory (ROM), and a random access memory (RAM). The calculation processing unit 23 performs a calculation process for controlling an operation of the gesture input device by reading out a program from the ROM, loading the program into the RAM, and executing the program. The calculation processing unit 23 reads out the message M corresponding to the prediction result of the gesture G from the storage unit 15 and supplies the message M to the notification unit 21 together with a notification command. Here, various kinds of processes may be performed on the message M according to the predicted one or more gestures G, which will be described in detail later. Further, the calculation processing unit 23 performs a predetermined calculation process, in order to execute a predetermined function for each gesture G according to the recognition result supplied from the recognition unit 17.

[2. A Basic Operation of the Gesture Input Device]

Figure 2:
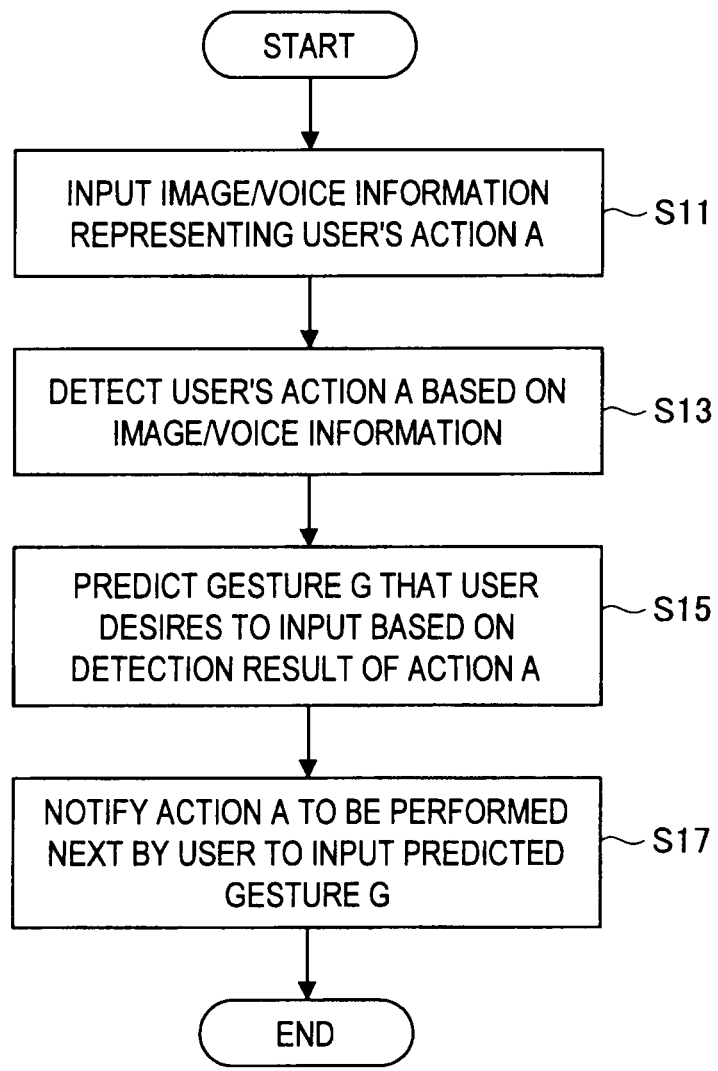
FIG. 2 is a flowchart illustrating a basic operation procedure of a gesture input device.

Next, a basic operation of the gesture input device will be described. FIG. 2 illustrates a basic operation procedure of the gesture input device.

In the gesture input device, in step S11, the image information and/or the voice information representing the user's action A are input to the input unit 11. When the user performs the action A, in step S13, the detection unit 13 extracts the feature quantity from the input image information and/or voice information and detects the user's action A. The detection result is supplied to the prediction unit 19.

In step S15, the prediction unit 19 compares the detection result of the action A with the feature quantity and predicts one or more gestures G that the user desires to input based on the comparison result. The prediction result is supplied to the calculation processing unit 23. The calculation processing unit 23 reads out the message M corresponding to the prediction result from the storage unit 15 and supplies the message M to the notification unit 21 together with the notification command. In step S17, the notification unit 21 notifies the user of the message M representing the action A to be performed next by the user in order to input the predicted one or more gestures G.

[3. An Operation Example of the Gesture Input Device]

First to fourth operation examples of the gesture input device will be described below with reference to FIGS. 3A to 4B. Further, a repeated explanation of the operation examples is omitted.

(A First Operation Example)

First, a first operation example of the gesture input device will be described with reference to FIGS. 3A and 3B.

In the first operation example, as illustrated in FIG. 3A, a first gesture G11 in which a hand in a "paper" shape of rock paper scissors is tilted from the normal position to the right and a second gesture G12 in which the hand in the "paper" shape is tilted to the left are input. When the hand in the "paper" shape is detected at the normal position and thereafter detected in a state tilted to the right, the recognition unit 17 recognizes the first gesture G11. Further, when the hand in the "paper" shape is detected at the normal position and thereafter detected in a state tilted to the left, the recognition unit 17 recognizes the second gesture G12.

Figure 3B:
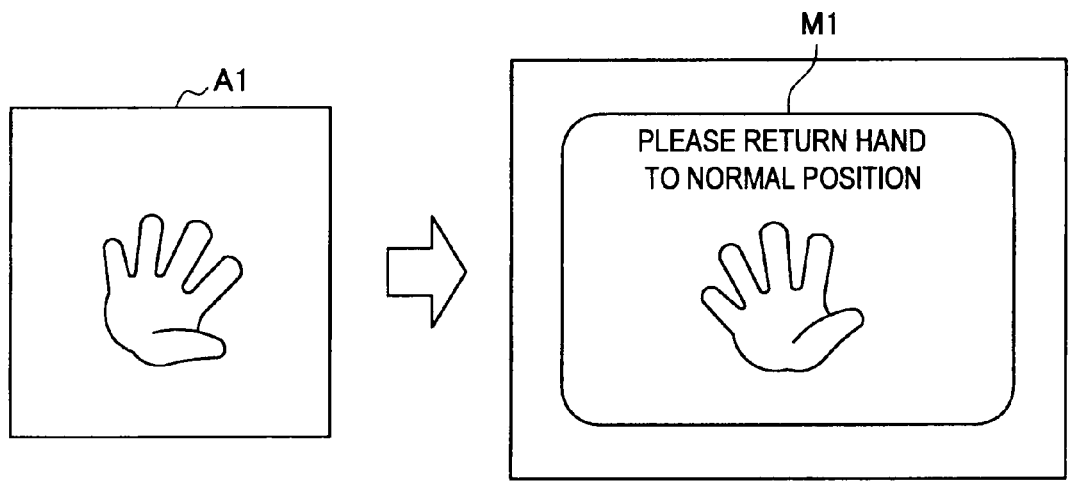
FIG. 3B is a diagram (2/2) illustrating the first operation example of the gesture input device.

Here, a case in which the hand in the "paper" shape is not detected at the normal position but detected in a state A1 tilted to the right for a predetermined time period as illustrated in FIG. 3B is supposed. In this case, since the hand in the "paper" shape has been detected in the state A1 tilted to the right, the prediction unit 19 predicts the first and second gestures G11 and G12 including the action A1 of the hand in the "paper" shape as the gesture that the user desires to input. The calculation processing unit 23 supplies the notification unit 21 with a message M1 representing an action A to be performed next by the user in order to input the first gesture G11 or the second gesture G12 based on the prediction result.

Here, in order to input either the first gesture G11 or the second gesture G12, the hand in the "paper" shape should be first returned to the normal position. In order to urge the user to perform the action A for returning the hand in the "paper" shape to the normal position, the message M1 "please return the hand to the normal position" is supplied. The notification unit 21 notifies the user of the supplied message M1, for example, as an image message. The user may be notified of the supplied message M1 as a voice message.

When the user is notified of the message M1, the user realizes that the gesture G has not correctly been recognized. The user returns the hand in the "paper" shape to the normal position according to the message M1 and then performs, for example, an action for tilting the hand to the left. Then, when the hand in the "paper" shape is detected at the normal position and thereafter detected in the state tilted to the right, the recognition unit 17 recognizes the first gesture G11.

(A Second Operation Example)

Next, a second operation example of the gesture input device will be described with reference to FIGS. 4A and 4B.

In the second operation example, as illustrated in FIG. 4A, a first gesture G21 for drawing a circle counterclockwise with the hand in the "paper" shape and a second gesture G22 for changing the hand in the "paper" shape to the "rock" shape while moving the hand to the right are input. When the hand in the "paper" shape drawing the circle counterclockwise is detected, the recognition unit 17 recognizes the first gesture G21. Further, when the hand changing from the "paper" shape to the "rock" shape while moving to the right is detected, the recognition unit 17 recognizes the second gesture G22.

Figure 4B:
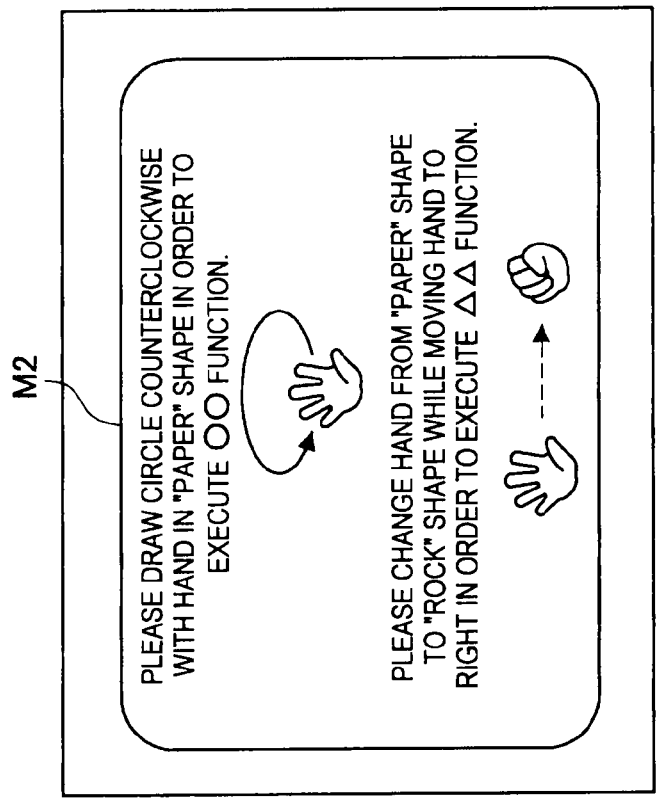
FIG. 4B is a diagram (2/2) illustrating the second operation example of the gesture input device.

Here, a case in which a state A2 of the hand in the "paper" shape that is moving to the right is detected as illustrated in FIG. 4B is supposed. In this case, since the hand in the "paper" shape is detected in the state A2 that is moving to the right, the prediction unit 19 predicts the first and second gestures G21 and G22 including the action A2 for moving the hand in the "paper" shape to the right as the gesture that the user desires to input. The calculation processing unit 23 supplies the notification unit 21 with a message M2 representing an action A to be performed next by the user in order to input the first gesture G21 or the second gesture G22 based on the prediction result.

Here, in order to input the first gesture G21, it is necessary to draw the circle counterclockwise with the hand in the "paper" shape. Further, in order to input the second gesture G22, it is necessary to change the hand in the "paper" shape to the "rock" shape while moving the hand to the right. For this reason, in order to urge the user to perform the action A appropriate to input the first gesture G21 or the second gesture G22, the message M2 "Please draw a circle counterclockwise with your hand in a 'paper' shape in order to execute a OO function. Please change your hand from a 'paper' shape to a 'rock' shape while moving it to the right in order to execute a ΔΔ function," is supplied. The notification unit 21 notifies the user of the supplied message M2, for example, as an image message.

Here, in the case of notifying of a message M3 representing an action A for inputting two or more gestures G, the notification unit 21 may notify of the message M3 so that each gesture G can be discriminated according to an input frequency of each gesture G. For example, if the input frequency of the first gesture G21 is high, a display of a section representing the action A for inputting the first gesture G21 may be output with a large letter or a bright color. Further, this section may be output with a large sound volume. As a result, the user can easily recognize the gesture G having the high input frequency.

When the user is notified of the message M2, the user confirms the gesture G to input in order to execute a desired operation. The user performs, for example, the action A of drawing the circle counterclockwise with the hand in the "paper" shape according to the message M2. Then, when the hand in the "paper" shape drawing the circle counterclockwise is detected, the recognition unit 17 recognizes the first gesture G21.

Here, the gesture G may be predicted by detecting the user's action A based on the voice information representing the user's utterance instead of the image information representing movement of the hand. For example, it is assumed that, in a music reproduction system, when a first gesture is input by an utterance "one song forward," and a second gesture is input by an utterance "one song back," an utterance "one song . . . (silence)" is detected. In this case, the prediction unit 19 predicts the first and second gestures and the notification unit 21 notifies the user of the message M2 "Please say 'one song forward' to move forward. Please say 'one music back' in order to move back."

(A Third Operation Example)

Next, a third operation example of the gesture input device will be described with reference to FIGS. 5A and 5B.

In the third operation example, as illustrated in FIG. 5A, first to third gestures G31 to G33 respectively made by combining a sub gesture SG31 with any of sub gestures SG321, SG322, and SG323 are input. For the first gesture G31, following the sub gesture SG31 for changing the hand in the "paper" shape to the "rock" shape while moving the hand to the right, the second sub gesture SG321 for drawing a circle clockwise with the hand in the "rock" shape is made.

For the second gesture G32, following the sub gesture SG31, the second sub gesture SG322 for moving the hand in the "rock" shape up and down is made. For the third gesture G33, following the sub gesture SG31, the second sub gesture SG323 for changing the hand in the "rock" paper to the "paper" shape while moving the hand to the right is made.

If the second sub gesture SG321 is recognized after the first sub gesture SG31 is recognized, the recognition unit 17 recognizes the first gesture G31. Similarly, if the second sub gesture SG322 is recognized after the first sub gesture SG31, the recognition unit 17 recognizes the second gesture G32. Further, if the second sub gesture SG323 is recognized after the first sub gesture SG31, the recognition unit 17 recognizes the third gesture G33.

Here, a case in which the first sub gesture SG31 is recognized as illustrated in FIG. 5B is supposed. In this case, the prediction unit 19 predicts the first to third gestures G31 to G33 including the first sub gesture SG31 as the gesture G that the user desires to input. The calculation processing unit 23 supplies the notification unit 21 with the message M3 representing the action A to be performed next by the user in order to input any one of the first to third gestures G31, G32, and G33 based on the prediction result.

Here, in order to input the first gesture G31, the second sub gesture SG321 should be input next. Further, in order to input the second gesture G32, the second sub gesture SG322 should be input next. Further, in order to input the third gesture G33, the second sub gesture SG323 should be input next.

In order to urge the user to perform the action A appropriate for inputting any one of the first to third gestures G31, G32, G33, the message M3 "Please draw a circle clockwise with your hand in a 'rock' shape in order to execute a OO function. Please move your hand in a 'rock' shape up and down in order to execute a □□ function. Please change your hand from a 'rock' shape to a 'paper' shape while moving the hand to the right in order to execute a ΔΔ function." is supplied. The notification unit 21 notifies the user of the supplied message M3, for example, as an image message.

Here, in the case of notifying of a message M4 for inputting two or more gestures G, the notification unit 21 may notify of the message M4 so that each sub gesture SG can be discriminated according to a transition probability P between the immediately previously input sub gesture SG and one or more sub gestures SG that the user desires to input next.

For example, let us assume that a transition probability P1 from the first sub gesture SG31 to the second sub gesture SG321 is higher than a transition probability P2 from the first sub gesture SG31 to the second sub gesture SG322 and a transition probability P3 from the first sub gesture SG31 to the second sub gesture SG323. In this case, a display of a section representing the action A for inputting the second sub gesture SG321 may be output with a large letter or a bright color. Further, this section may be output with a large sound volume. Further, the transition probability P between the sub gestures SG may be learned online or offline. As a result, the user can easily recognize the sub gesture SG having the high transition probability.

When the message M3 is notified of, the user confirms the sub gesture SG to input in order to execute a desired operation. The user performs, for example, the action A corresponding to the second sub gesture SG321 according to the message M3. Then, when the action A corresponding to the second sub gesture SG321 is detected, the recognition unit 17 recognizes the first gesture G31.

Here, the gesture G may be predicted by detecting the user's action A based on the voice information representing the user's utterance instead of the image information representing movement of the hand. For example, in a music reproduction system, a first gesture is made when following a first sub gesture (utterance) "change to the next album," a second sub gesture (utterance) "continuous reproduction" is performed. Further, a second gesture is made when following a first sub gesture, a second sub gesture (utterance) "shuffle reproduction" is performed. At this time, let us assume that the first sub gesture "change to the next album . . . (silence)" is detected.

In this case, the prediction unit 19 predicts the continuous reproduction and the first and second gestures. The notification unit 21 notifies the user of the message M3 "Please say 'continuous reproduction' in order to continuously reproduce the next album. Please say 'change to the next album' and 'shuffle reproduction' in order to perform the shuffle reproduction."

(A Fourth Operation Example)

Next, a fourth operation example of the gesture input device will be described with reference to FIGS. 6A and 6B.

Figure 6A:
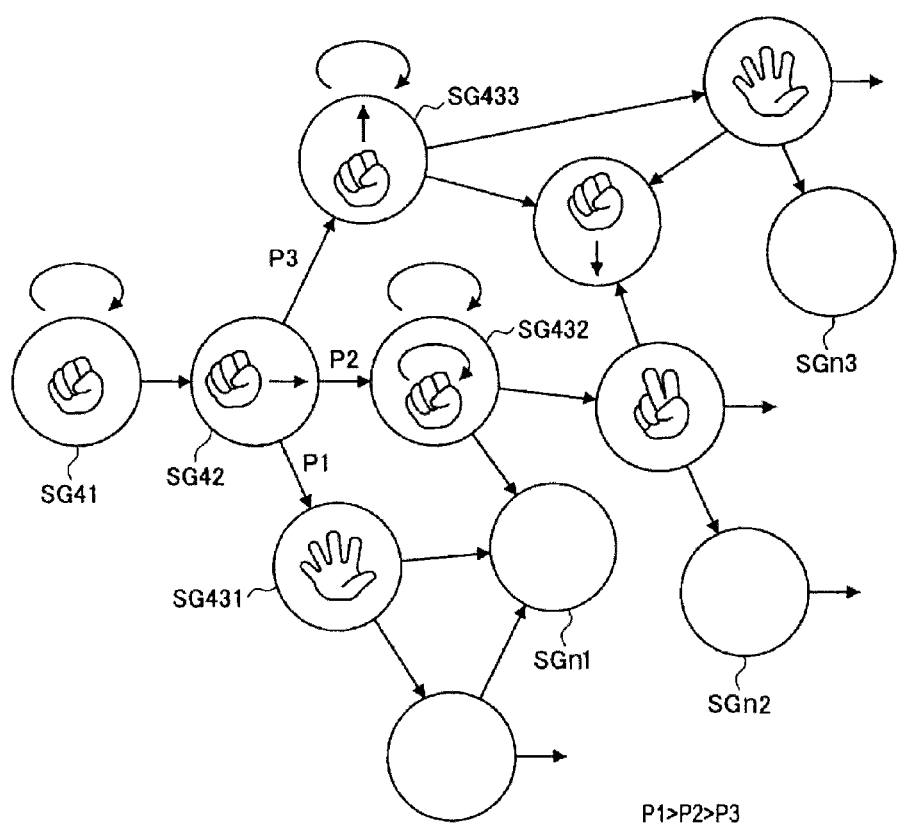
FIG. 6A is a diagram (1/2) illustrating a fourth operation example of a gesture input device.

In the fourth operation example, as illustrated in FIG. 6A, a plurality of gestures G configured with an unspecified number of sub gestures SG is input. For example, for a first gesture, following a first sub gesture SG41 for stopping the hand in the "rock" shape, a second sub gesture SG42 for moving the hand in the "rock" shape to the right, and a third sub gesture SG431 for stopping the hand in the "paper" shape, a fourth sub gesture to an n1-th sub gesture SGn1 are made.

Similarly, for a second gesture, following the first and second sub gestures SG41 and SG42 and a third sub gesture SG432 for drawing a circle clockwise with the hand in the "rock" shape, a fourth sub gesture to an n2-th sub gesture SGn2 are made. Further, for a third gesture, following the first and second sub gestures SG41 and SG42 and a third sub gesture SG433 for moving the hand in the "rock" shape up, a fourth sub gesture to an n3-th sub gesture SGn3 are made.

Further, the fourth sub gestures may be the same sub gesture SG or different sub gestures SG. Further, the number n1, n2, and n3 of sub gestures SG that constitute the first to third gestures, respectively, may be the same or different from each other.

Here, for example, the transition probability P between the sub gestures SG is determined, in advance, like P1 between the second sub gesture SG42 and the third sub gesture SG431, P2 between the second sub gesture SG42 and the third sub gesture SG432, and P3 between the second sub gesture SG42 and the third sub gesture SG433. Further, for example, in the first sub gesture SG41, a reiteration probability P for reiterating the same sub gesture SG41 and a transition probability P for transitioning to the second sub gesture SG42 are determined in advanced.

If the first and second sub gestures SG41 and SG42, the third sub gesture SG431, the fourth sub gesture, . . . , the n1-th sub gesture SGn1 are recognized, the recognition unit 17 recognizes the first gesture. Similarly, if the first and second sub gestures SG41 and SG42, the third sub gesture SG432, the fourth sub gesture, . . . , the n2-th sub gesture SGn2 are recognized, the recognition unit 17 recognizes the second gesture. Further, if the first and second sub gestures SG41 and SG42, the third sub gesture SG433, the fourth sub gesture, . . . , the n3-th sub gesture SGn3 are recognized, the recognition unit 17 recognizes the third gesture.

Figure 6B:
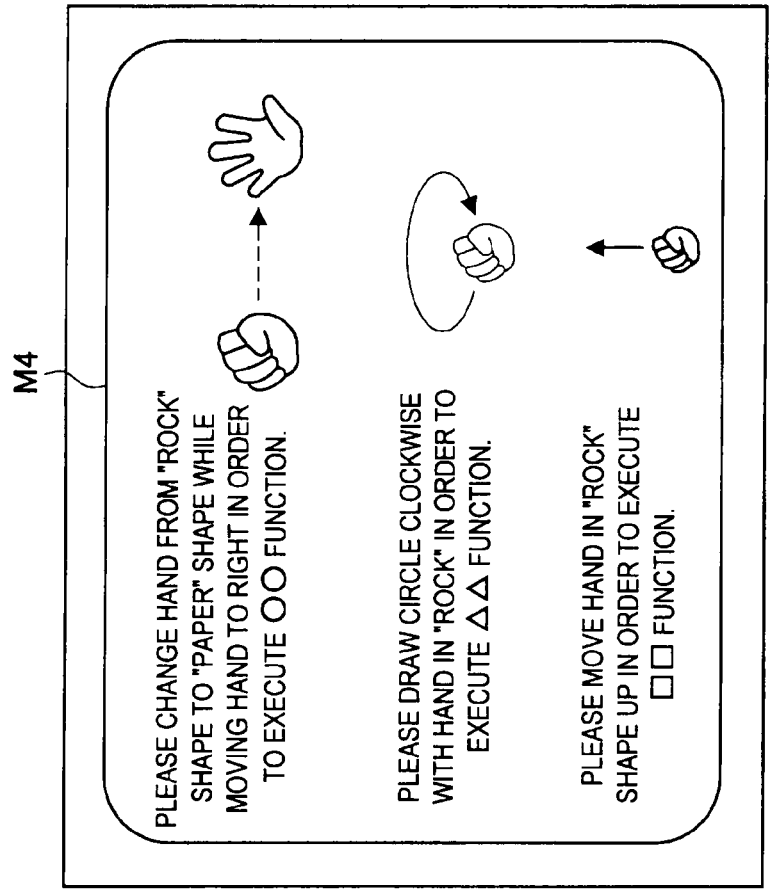
FIG. 6B is a diagram (2/2) illustrating the fourth operation example of the gesture input device.

Here, a case in which the second sub gesture SG42 is recognized as illustrated in FIG. 6B is supposed. In this case, the prediction unit 19 predicts at least the first to third gestures including the first and second sub gestures SG41 and SG42 as the gesture G that the user desires to input. The calculation processing unit 23 supplies the notification unit 21 with the message M4 representing the action A to be performed next by the user in order to input at least the first to third gestures based on the prediction result.

Here, in order to input the first gesture, the third sub gesture SG431 should be input next. Further, in order to input the second gesture, the third sub gesture SG432 should be input next. Further, in order to input the third gesture, the third sub gesture SG433 should be input next.

In order to urge the user to perform the action A appropriate for inputting any one of the first to third gestures, the message M4 "Please change your hand from a 'rock' shape to a 'paper' shape while moving the hand to the right in order to execute a OO function. Please draw a circle clockwise with your hand in a 'rock' shape in order to execute a ΔΔ function. Please move your hand up in a 'rock' shape in order to execute a □□ function," is supplied. The notification unit 21 notifies the user of the supplied message M4, for example, as an image message.

Here, in the case of notifying of the message M4 for inputting two or more gestures G, the notification unit 21 may notify of the message M4 so that each sub gesture SG can be discriminated according to a transition probability P between the immediately previously input sub gesture SG and one or more sub gestures SG that the user desires to input next.

For example, let us assume that a transition probability P1 from the second sub gesture SG42 to the third sub gesture SG431 is higher than a transition probability P2 from the second sub gesture SG42 to the third sub gesture SG432 and a transition probability P3 from the second sub gesture SG42 to the third sub gesture SG433. In this case, a display of a section representing the action A for inputting the third sub gesture SG431 may be output with a large letter or a bright color. Further, the section may be output with a large sound volume. Further, the transition probability P between the sub gestures SG may be learned online or offline.

When the message M4 is notified of, the user confirms the sub gesture SG to input in order to execute a desired operation. The user performs, for example, the action A corresponding to the third sub gesture SG431 according to the message M4. Then, when the action A corresponding to the third sub gesture SG431 is detected, the recognition unit 17 performs the recognition process on the fourth sub gesture. Here, when the third sub gesture SG431 is input, the calculation processing unit 23 can judge that the user desires to input the gestures G different from the second and third gestures.

Here, the gesture G may be predicted by detecting the user's action A based on the voice information representing the user's utterance instead of the image information representing movement of the hand. Further, the gesture G may be predicted by detecting the user's action A based on a combination of the image information representing the user's action and the voice information. In this case, each sub gesture SG may be predicted based on the image information, the voice information or a combination of the image information and the voice information. Further, each gesture G may include the sub gesture SG specified from the image information and/or the sub gesture SG specified from the voice information.

[4. Summary]

As described above, according to the gesture input device according to an embodiment of the present invention, one or more gestures G that the user desires to input are predicted based on the detection result of the user's action A, and in order to input the predicted one or more gestures G, the user is notified of the action A to be performed next by the user. As a result, even if a kind and/or complexity of the gesture G increases, the user can correctly input the gesture G according to the notification of the action A to be performed next.

As described above, the exemplary embodiments of the present invention have been described hereinbefore in detail with reference to the accompanying drawings, but the present invention is not limited to the embodiments. A person having ordinary skill in the art would understand that various modifications or variations can be made within the scope of the technical spirit defined in the claims and included within the technical scope of the invention.

For example, the operation examples have been described focusing on the case in which the gesture is predicted based on the image information representing the user's action. However, the gesture may be predicted based on the voice information or a combination of the image information and the voice information instead of the image information representing the user's action.

The present application contains subject matter related to that disclosed in Japanese Priority Patent Application JP 2010-70757 filed in the Japan Patent Office on Mar. 25, 2010, the entire content of which is hereby incorporated by reference.

What is claimed is:

1. A gesture input device, comprising:
circuitry configured to
receive image information of an object, which is capable of forming a plurality of shapes,
detect which of the plurality of shapes is being formed by the object included in the image information,
determine one or more candidate gestures based on the detected one of the plurality of shapes being formed by the object, and
control notification of an action to be performed next to input each of at least one of the one or more candidate gestures, wherein
at least one of the one or more candidate gestures includes two or more sub gestures, and
the circuitry is further configured to
recognize a first sub gesture based on a detected action performed by the object,
predict one or more candidate sub gestures to be input next based on a recognition result of the first sub gesture, and
control notification of an action to be performed next to input each of the at least one of the one or more candidate sub gestures.

2. The gesture input device according to claim 1, wherein a transition probability between the sub gesture and the one or more candidate sub gestures is calculated, and the circuitry controls notification of the action to be performed next so that each candidate sub gesture can be discriminated according to a transition probability between an immediately previously input sub gesture and the one or more candidate sub gestures to be input next.

3. The gesture input device according to claim 1, wherein an input frequency of each gesture is recorded, and the circuitry controls notification of the action to be performed next so that each gesture can be discriminated according to an input frequency of each gesture included in the one or more candidate gestures.

4. A gesture input method of an information processing apparatus, comprising:
receiving image information of an object, which is capable of forming a plurality of shapes;
detecting which of the plurality of shapes is being formed by the object included in the image information;
determining, by circuitry of the information processing apparatus, one or more candidate gestures based on the detected one of the plurality of shapes being formed by the object; and
notifying of an action to be performed next to input each of at least one of the one or more candidate gestures, wherein
at least one of the one or more candidate gestures includes two or more sub gestures, and the method further includes
recognizing a first sub gesture based on a detected action performed by the object,
predicting one or more candidate sub gestures to be input next based on a recognition result of the first sub gesture, and
controlling notification of an action to be performed next to input each of the at least one of the one or more candidate sub gestures.

5. A non-transitory computer readable recording medium encoded with a program for causing a computer to execute a gesture input method, the method comprising:
receiving image information of an object, which is capable of forming a plurality of shapes;

detecting which of the plurality of shapes is being formed by the object included in the image information;

determining, by the computer, one or more candidate gestures based on the detected one of the plurality of shapes being formed by the object; and notifying of an action to be performed next to input each of at least one of the one or more candidate gestures, wherein at least one of the one or more candidate gestures includes two or more sub gestures, and the method further includes recognizing a first sub gesture based on a detected action performed by the object, predicting one or more candidate sub gestures to be input next based on a recognition result of the first sub gesture, and controlling notification of an action to be performed next to input each of the at least one of the one or more candidate sub gestures.

6. The gesture input device according to claim 1, wherein the object is a hand.

7. The gesture input device according to claim 1, wherein the circuitry is further configured to control notification of a plurality of different actions to be performed next, each of the plurality of different actions corresponding to a different one of the one or more candidate gestures.

8. The gesture input device according to claim 1, wherein the circuitry is further configured to detect an action being performed by the object and determine the one or more candidate gestures based on the detected one of the plurality of shapes being formed, and the action being performed, by the object.

* * * * *